(12) United States Patent
Nguyen

(10) Patent No.: US 6,308,189 B1
(45) Date of Patent: Oct. 23, 2001

(54) APPARATUS FOR PARTIAL LOGICAL SHIFTS AND METHOD THEREFOR

(75) Inventor: Huy Van Nguyen, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/089,716

(22) Filed: Jun. 3, 1998

(51) Int. Cl.[7] .................................................. G06F 7/00
(52) U.S. Cl. ............................................................ 708/209
(58) Field of Search ................................. 708/205, 209; 377/69, 73

(56) References Cited

U.S. PATENT DOCUMENTS

| | | | |
|---|---|---|---|
| 4,282,581 | * 8/1981 | Bondurant et al. | 708/209 |
| 4,451,883 | 5/1984 | Stanley et al. | 364/200 |
| 4,653,019 | 3/1987 | Hodge et al. | 364/900 |
| 4,839,839 | 6/1989 | Tokumaru et al. | 364/715.08 |
| 4,931,971 | * 6/1990 | Cook et al. | 708/209 |
| 5,218,647 | 6/1993 | Blonstein et al. | 382/17 |
| 5,465,222 | 11/1995 | Seckora | 364/715.08 |
| 5,729,482 | * 3/1998 | Worrell | 708/209 |

\* cited by examiner

*Primary Examiner*—Chuong Dinh Ngo
(74) *Attorney, Agent, or Firm*—Barry S. Newberger; Winstead Sechrest & Minick P.c.; Robert M. Carwell (57) ABSTRACT

An apparatus and method for performing partial logical shifts of a multiple-word logical signal is implemented. Portions of an input logical signal to be shifted are input to a plurality of barrel shifters. Each barrel shifter performs a rotation of its associated input portion. Each corresponding rotated portion output therefrom is masked with a preselected mask having m trailing zero bits, for a left shift, or m leading zero bits, for a right shift. Rotated portions from barrel shifters succeeding, for a left shift, or preceding, for a right shift, the barrel shifter associated with the corresponding rotated portion are masked with a complementary mask and logically combined with the masked rotated portion from the corresponding barrel shifter to form a corresponding portion of the shifted output signal.

26 Claims, 6 Drawing Sheets

APPARATUS FOR PARTIAL LOGICAL SHIFTS AND METHOD THEREFOR

TECHNICAL FIELD

The present invention relates in general to data processors, and in particular, to logical shift operations in data processors.

BACKGROUND INFORMATION

Vector processing extensions to scalar microprocessor architectures are being implemented to enhance microprocessor performance, particularly with respect to multimedia applications. One such vector processing extension is the Vector Multimedia Extension (VMX) to the POWERPC microprocessor architecture. ("PowerPC" is a trademark of IBM Corporation.) VMX is a single instruction multiple data (SIMD) architecture. In a SIMD architecture, a single instruction operates on multiple sets of operands. For example, in a 128-bit SIMD architecture, an instruction may operate on sixteen 8-bit operands, eight 16-bit operands, four 32-bit operands, or one 128-bit operand.

Logical shift operations within the VMX instruction set require the implementation of a shifter in the microprocessor hardware incorporating the VMX extension. In general, a 128-bit barrel shifter is expensive to implement. Furthermore, in a VMX implementation in which logical shifts do not require a full 128-bit shift, realizing a full 128-bit barrel shifter wastes resources.

Thus, there is a need in the art for a mechanism to implement partial logical shifts in vector processing hardware which obviates the need for a 128-bit barrel shifter.

SUMMARY OF THE INVENTION

The previously mentioned needs are addressed with the present invention. Accordingly, there is provided, in a first form, an apparatus for generating partial logical shifts of a logical signal. The apparatus includes a plurality of barrel shifters, each barrel shifter having an input adapted for receiving a portion of the logic signal, and a plurality of logic circuits, each logic circuit having a first input coupled to an output of a corresponding barrel shifter. A first subset of the plurality of logic circuits has a second input coupled to an output of a succeeding barrel shifter, and a second subset of the plurality of logic circuits has a third input coupled to an output of a preceding barrel shifter. An output of each logic circuit outputs a portion of a partially shifted logic signal, the output of each logic circuit being a logical combination formed in response to the output of the corresponding barrel shifter and the second and third input signals.

There is also provided, in a second form, a method of generating m-bit partial logical shifts of a logical signal. The method includes rotating each portion of a plurality of portions of the logical signal by m-bits, thereby forming a plurality of corresponding rotated portions. Each of the rotated portions is masked with a preselected mask signal, and with a complementary mask formed by complementing the preselected mask signal. Each logical output from the step of masking with a preselected mask is logically combining with a preselected one of each logical output from the step of masking with the complementary mask to form a portion of an m-bit shifted output logical signal.

Additionally, there is provided, in a third form, a data processing system. The data processing system includes an instruction dispatch device adapted for retrieving instructions from an instruction storage device, a partial logical shift device coupled to the instruction dispatch device and generating a partially shifted output signal from a logic signal received from the dispatch device in response to instructions therefrom. The shift device comprises a plurality of barrel shifters, each barrel shifter having an input adapted for receiving a portion of the logic signal, a plurality of logic circuits, each logic circuit having a first input coupled to an output of a first predetermined barrel shifter, and a second input coupled to an output of a second predetermined barrel shifter, wherein each of the logic circuits outputs a portion of the shifted output signal, the output of each logic circuit being a logical combination formed in response to the first and second inputs.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides a logical shift mechanism in vector processing extensions in superscalar microprocessors. The present invention uses pre-existing barrel shifters in the extension to implement logical word shifts with shifts of up to the size of the pre-existing barrel shifters.

In the following description, numerous specific details are set forth, such as specific word or byte lengths, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Description of Connectivity

Operation of the present invention will subsequently be described in greater detail. Prior to that discussion, however, a description of the connectivity of the elements of the present invention will be provided.

Figure 1:
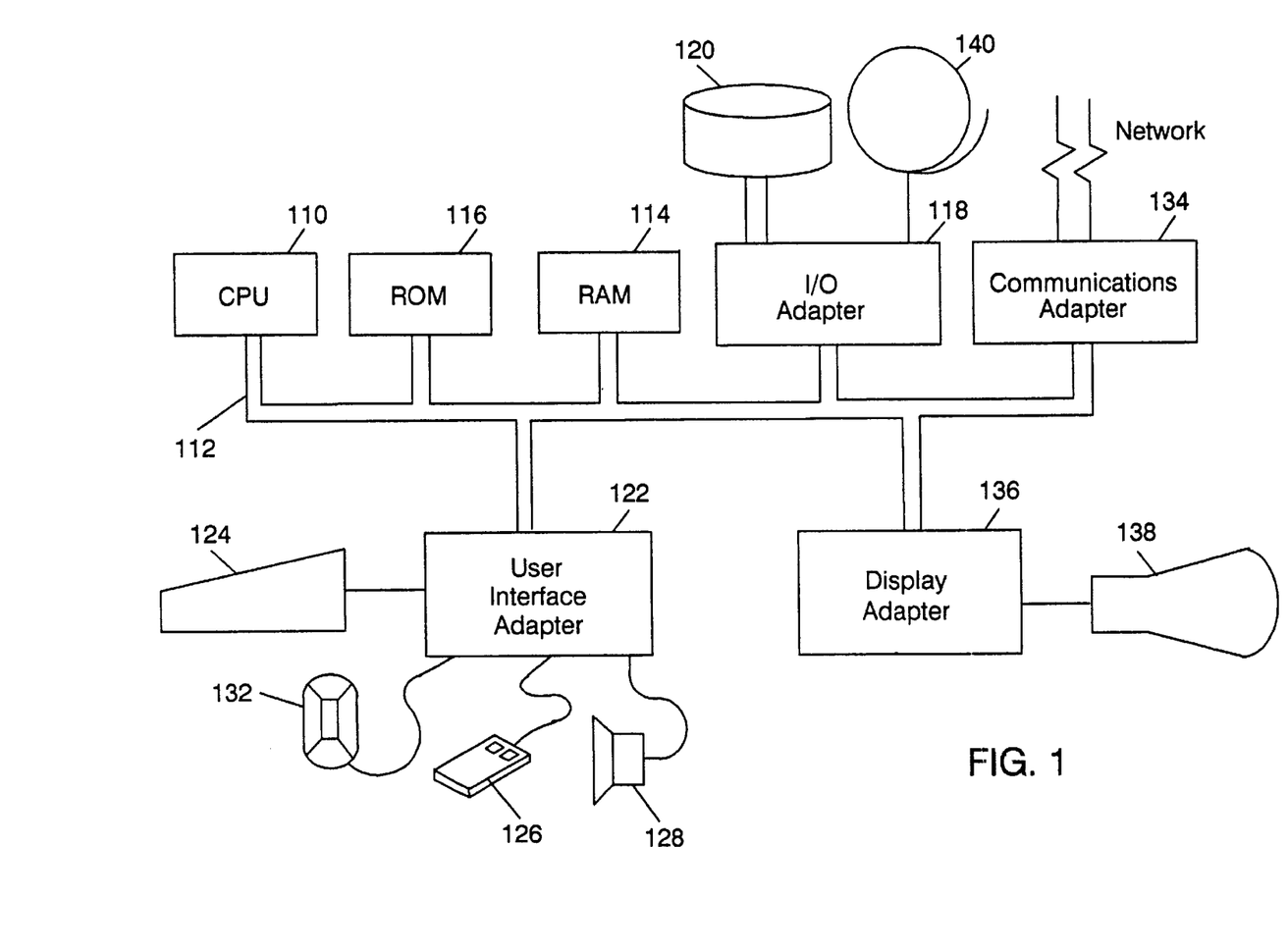
FIG. 1 illustrates, in block diagram form, a data processing system in accordance with one embodiment of the present invention.

Referring first to FIG. 1, an example is shown of a data processing system 100 which may be used for the invention. The system has a central processing unit (CPU) 110, such as a POWERPC microprocessor ("PowerPC" is a trademark of IBM Corporation) according to "The PowerPC Architecture: A Specification for a New Family of RISC Processors", 2d ed., 1994, Cathy May, et al., eds., which is hereby incorporated by reference. A more specific implementation of a PowerPC microprocessor is described in the "PowerPC 604 RISC Microprocessor User's Manual", 1994, IBM Corporation, which is hereby incorporated herein by reference. CPU 110 includes a vector processing extension to the PowerPC architecture. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. I/O devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this matter, a user is capable of inputting to the system through the keyboard 124, track ball 132, or mouse 126 and receiving output from the system via speaker 128 and display 138. Additionally, an operating system such as AIX ("AIX" is a trademark of the IBM Corporation) is used to coordinate the functions of the various components shown in FIG. 1.

Figure 2:
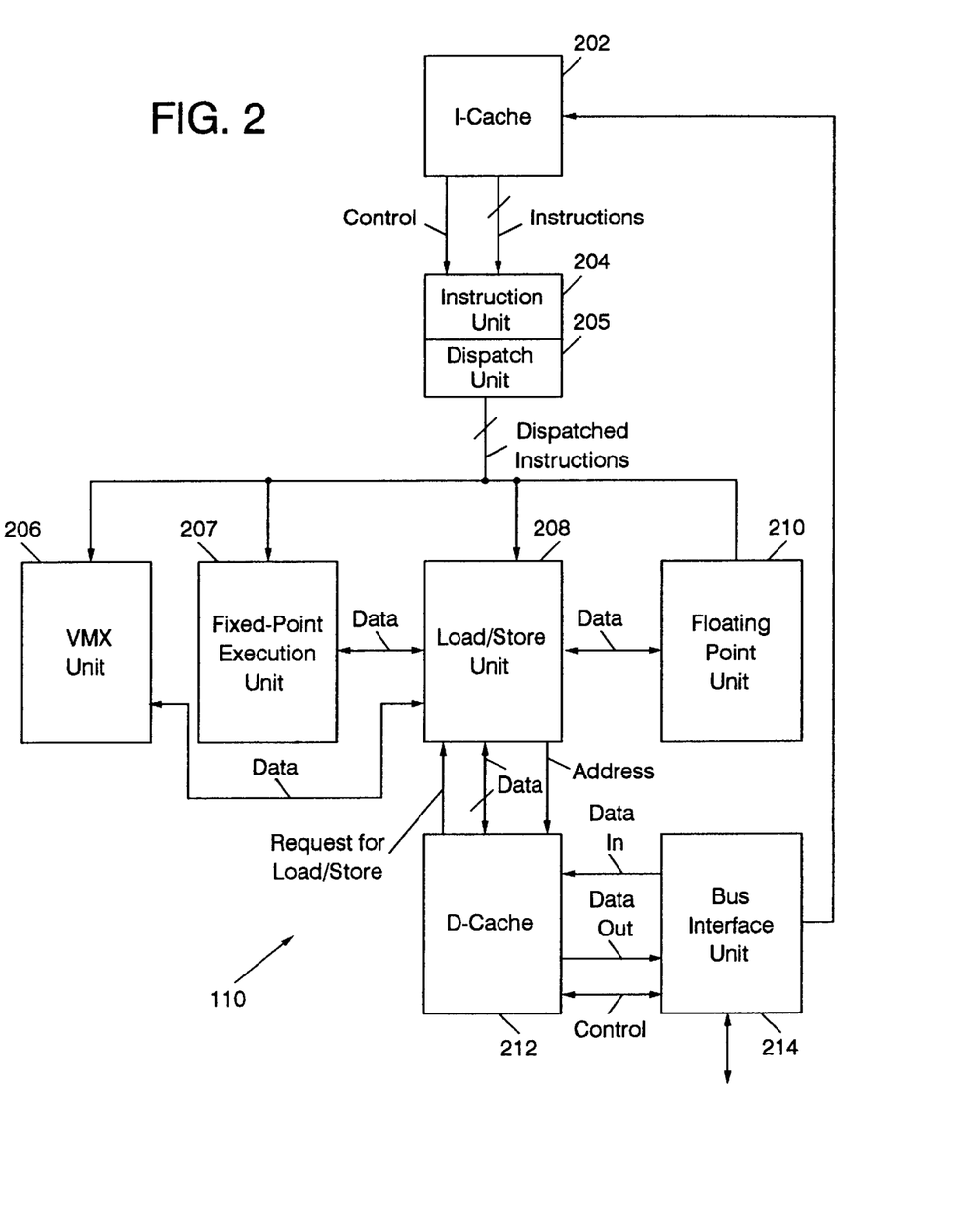
FIG. 2 illustrates, in block diagram form, a central processing unit in accordance with one embodiment of the present invention.

FIG. 2 illustrates a portion of CPU 110 in greater detail. The portion of CPU 110 comprises an instruction cache (I-cache) 202, an instruction unit 204, including a dispatch unit 205, a Vector Multimedia Extension unit (VMXU) 206, a fixed point execution unit (FXU) 207, a load/store unit 208, a floating point unit (FPU) 210, a data cache (D-cache) 212, and a bus interface unit (BIU) 214. I-cache 202 is coupled to dispatch unit 205 within instruction unit 204 to communicate control information in a plurality of instructions. Dispatch unit 205 is coupled to each of VMXU 206, FXU 207, load/store unit 208, and FPU 210 to provide a plurality of decoded, dispatched instructions. I-cache 202 is coupled to BIU 214 to communicate data and control information. Load/store unit 208 is coupled to each of VMXU 206, FXU 207, and FPU 210 to communicate data values. Load/store unit 208 is also coupled to D-cache 212 to communicate a request for a load/store signal, a plurality of data values, and an address value. D-cache 212 is coupled to BIU 214 to communicate a Data In signal, a Data Out signal, and a Control signal.

Figures 3, 3A:
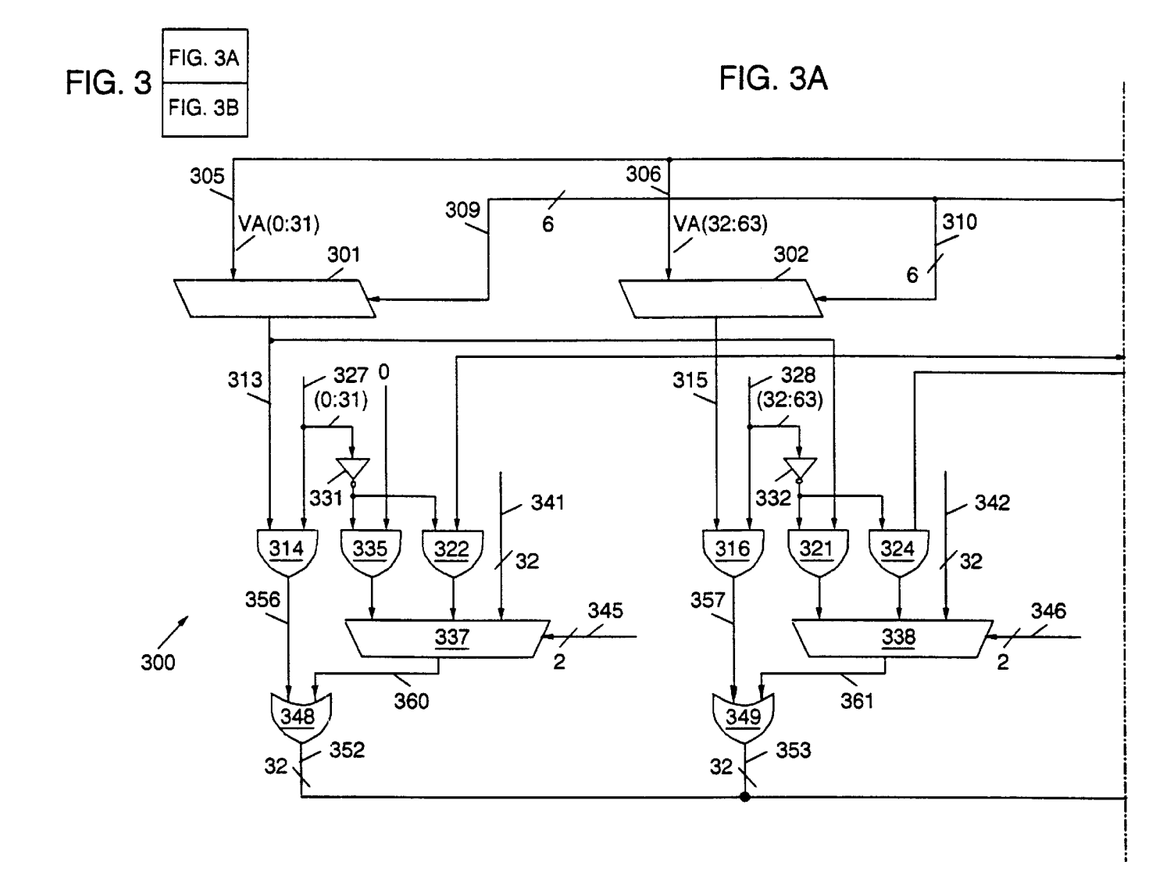
FIG. 3 illustrates, in schematic form, a partial vector word shift mechanism in accordance with one embodiment of the present invention.
Figure 3B:
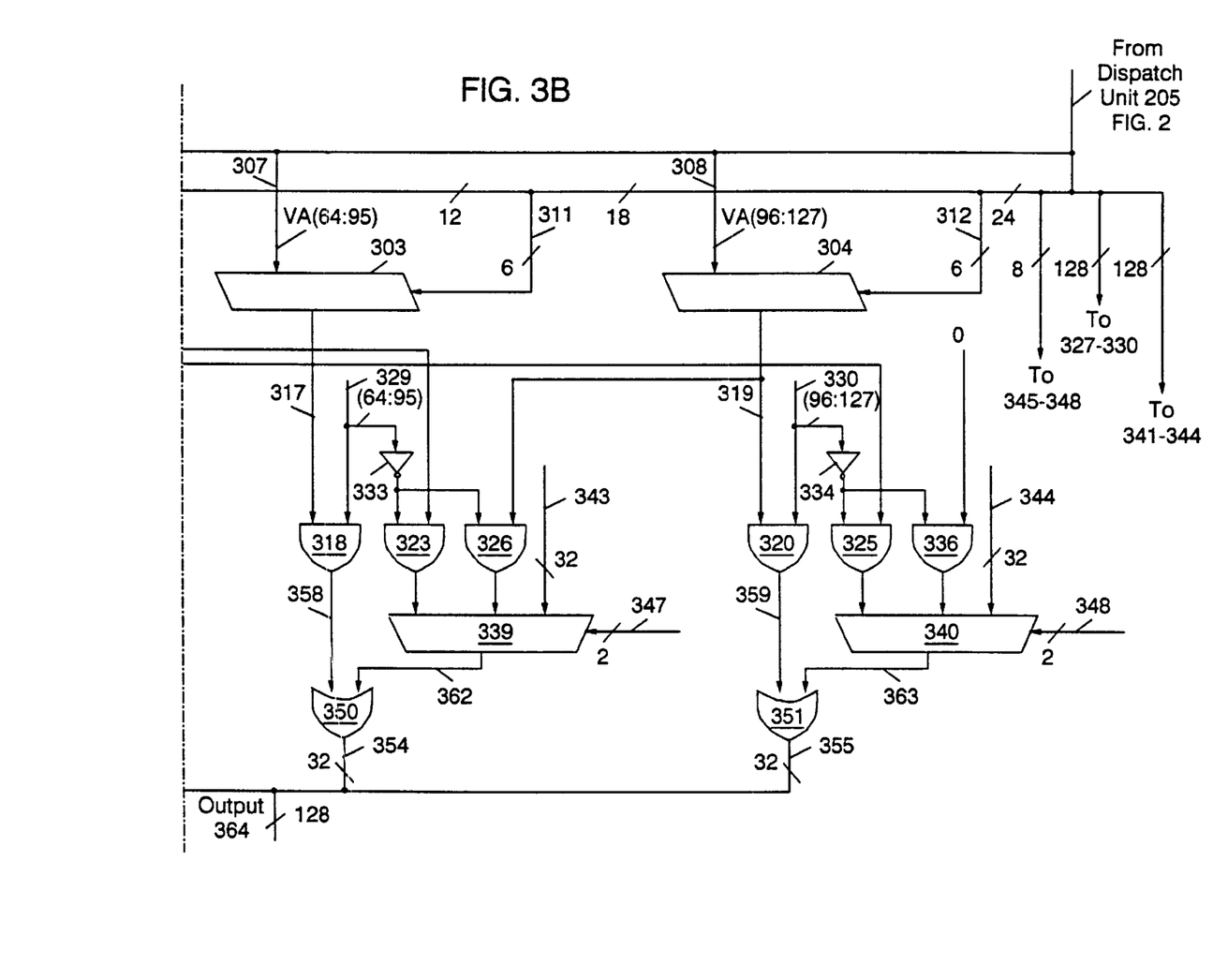

FIG. 3 illustrates a vector word shift mechanism 300 according to the principals of the present invention. Vector word shift mechanism 300 is incorporated in VMXU 206 in CPU 110. Operand, VA, is provided to vector word shift mechanism 300 by dispatch unit 205 in FIG. 2. A portion of VA is input to each of four barrel shifters, 301–304, at inputs 305–308, respectively. Each barrel shifter 301–304 receives control signal 309–312, respectively, that determines a number of bits of rotation performed by each of barrel shifters 301–304. Vector word shift mechanism 300 may be used to simultaneously generate shifts of four 32-bit words, in which case each of barrel shifters 301–304 may perform a rotation independent of any of the other barrel shifters, in which case each of signals 309–312 may be different. However, vector word shift mechanism 300 may, according to the principles of the present invention, implement a shift operation on the operand, VA, in which instance, each of control signals 309–312 have the same value. Barrel shifters 301–304 have been illustrated to be 32-bit shifters. However, it would be understood that an alternative embodiment of the present invention may employ barrel shifters having other, pre-determined, bit sizes.

The output of each barrel shifter 301–304 represents an m bit rotation of the respective input 305–308. The value of m may be any integer value not exceeding the size of barrel shifters 301–304. In a logical shift, in which an embodiment of vector word shift mechanism 300 outputs an m-bit logical shift of a 128-bit input operand, output 313 of barrel shifter 301 represents an m-bit rotation of the first 32-bits of the input operand, VA. Likewise, the outputs 315, 317 and 319 of barrel shifters 302–304, respectively, represent m-bit rotations of their respective inputs 306–308, constituting 32-bit portions of operand VA.

Each output of a barrel shifter is coupled to an input of an AND gate. Output 313 is coupled to an input of AND gate 314. Similarly, output 315 of barrel shifter 302 is coupled to an input of AND gate 316, output 317 of barrel shifter 303 to an input of AND gate 318 and an output 319 of barrel shifter 304 is coupled to an input of AND gate 320.

Each of outputs 313, 315, 317, and 319 are further coupled to one or more additional AND gates. Output 313 of barrel shifter 301 is also coupled to an input of AND gate 321 (for which barrel shifter 301 is a preceding barrel shifter). Output 315 of barrel shifter 302 is coupled to an input of AND gate 322 (for which barrel shifter 302 is a succeeding barrel shifter) and an input of AND gate 323 (for which barrel shifter 302 is a preceding barrel shifter). AND gate 324 has an input connected to output 317 of barrel shifter 303 (a succeeding barrel shifter 303) that is also coupled to an input of AND gate 325 (for which barrel shifter is a preceding barrel shifter). An input of AND gate 326 is connected to output 319 of barrel shifter 304 (a succeeding barrel shifter).

Each of AND gates 314, 316, 318 and 320 also receives a clear mask signal from dispatch unit 205. Clear masks 327–330 are respectively coupled to a second input of AND gates 314, 316, 318 and 320.

Clear masks 327–330 are also inverted and coupled to an input of AND gates 335, 321, 323 and 325. Clear masks 327–330 are inverted by inverters 331–334, respectively. An output of inverter 332 is coupled to a second input of AND gate 321, and output of inverter 333 is coupled to a second input of AND gate 323. Output of inverter 331 is coupled to an input of AND gate 335 which has a second input receiving a plurality of bits all of which are zero. Similarly, an output of inverter 334 is coupled to AND gate 336 which also has a second input receiving a plurality of bits, all of which are zero. The plurality of bits comprising the second input to AND gate 335 and the second input to AND gate 336 may each include thirty-two zero bits, in an embodiment of the present invention.

Vector word shift mechanism 300 selects for left-shift, and right-shift operations via multiplexers (MUX) 337–340.

Multiplexer 337 receives an output from AND gate 335 and an output from AND gate 322. Similarly, MUX 338 receives an output from AND gate 321 and AND gate 324. Outputs from AND gate 323 and 326 are provided to a respective input of MUX 339, and inputs to MUX 340 each receive an output from AND gate 325 and 336. Additionally, each of MUXs 337–340 receive a sign extension mask 341–344, respectively. Sign extension masks 341–344 are received from dispatch unit 205, FIG. 2. Sign extension masks are used in effecting m-bit vector shifts in vector word shift mechanism 300.

Each MuXs 337–340 selects among its three input signals, each input signal including a plurality of bits, under the control of a corresponding control signal 345–348. Control signals 345–348 are received from dispatch unit 205, FIG. 2.

Outputs from MUXs 337–340 are coupled to an input of OR gates 348–351, respectively. An output of OR gates 348–351 each form a portion of output 364 of vector word shift mechanism 300. OR gate 348 logically ORs an output of AND gate 314 and an output of MUX 337. Similarly, OR gate 349 ORs outputs of AND gate 316 and MUX 338, OR gate 350 ORs outputs of AND gate 318 and MUX 339, and OR gate 351 ORs an output of AND gate 320, and an output of MUX 340. Each of OR gates 348–351 output a portion of output 364 of vector word shifter 300.

The text provided above is to describe the connectivity of the present invention. Description of the operation of the present invention will subsequently be provided in greater detail.

Description of Operation

FIG. 1 illustrates a data processing system 100 which implements one embodiment of the present invention. It should be noted that the present invention is implemented in a portion of CPU 110, and is used to perform logical operations on data received from a remaining portion of data processing system 100 and to provide resultant data to the remaining portion of data processing system 100.

FIG. 2 illustrates a portion of CPU 110 in greater detail. During operation of one embodiment of the present invention, instructions are fetched from I-cache 202 and provided to dispatch unit 205 within instruction unit 204. Instructions are dispatched to their respective execution units by dispatch unit 205. Dispatch unit 205 determines which instructions are eligible to be dispatched in a current processor cycle. Dispatch unit 205 predecodes instructions and dispatches instructions to the target execution unit, such as VMXU 206, FXU 207 or FPU 210, along with any source operands. Information about each of the instructions is transferred to the appropriate one of VMXU 206, FXU 207, load/store unit 208, and FPU 210 via the dispatched instructions.

Vector logical shift instructions are dispatched to VMXU 206 for execution by vector word shift mechanism 300. Logical shift operations shift the instruction operand by a preselected number, m, of bits. Bits may be shifted to the left in response to a left shift instruction, and shifted to the right in response to a right shift instruction. In a right shift operation, by m-bits, the m lowest significant bits are lost, and the m most significant bits are replaced by m zeros. Similarly, in a left shift operation, by m-bits, the m most significant bits are lost, and the m least significant bits are replaced by m zeros.

In vector word shift mechanism 300, in FIG. 3, source operand, VA, is received from dispatch unit 205 in FIG. 2. In an embodiment of the present invention, operand VA may be 128 bits in length. In such an embodiment, bits 0:31 are received on input 305 to barrel shifter 301. Input 306 to barrel shifter 302 receives bits 32:63 of operand VA, input 307 to barrel shifter 303 receives bits 64:95, and input 308 to barrel shifter 304 receives bits 96:127.

Although operand VA has been shown to be 128 bits in length, it would be understood that alternative embodiments may operate on source operands of other lengths. The principles of the present invention may be incorporated in vector shift mechanisms including barrel shifters 301–304 having a predetermined size which may have a value other than 32 bits. In yet another embodiment of vector shift mechanism 300 according to the present invention, a predetermined number of barrel shifters, which may be larger than four, may be incorporated in order to accommodate a source operand VA larger than 128 bits in length.

Figure 4A:
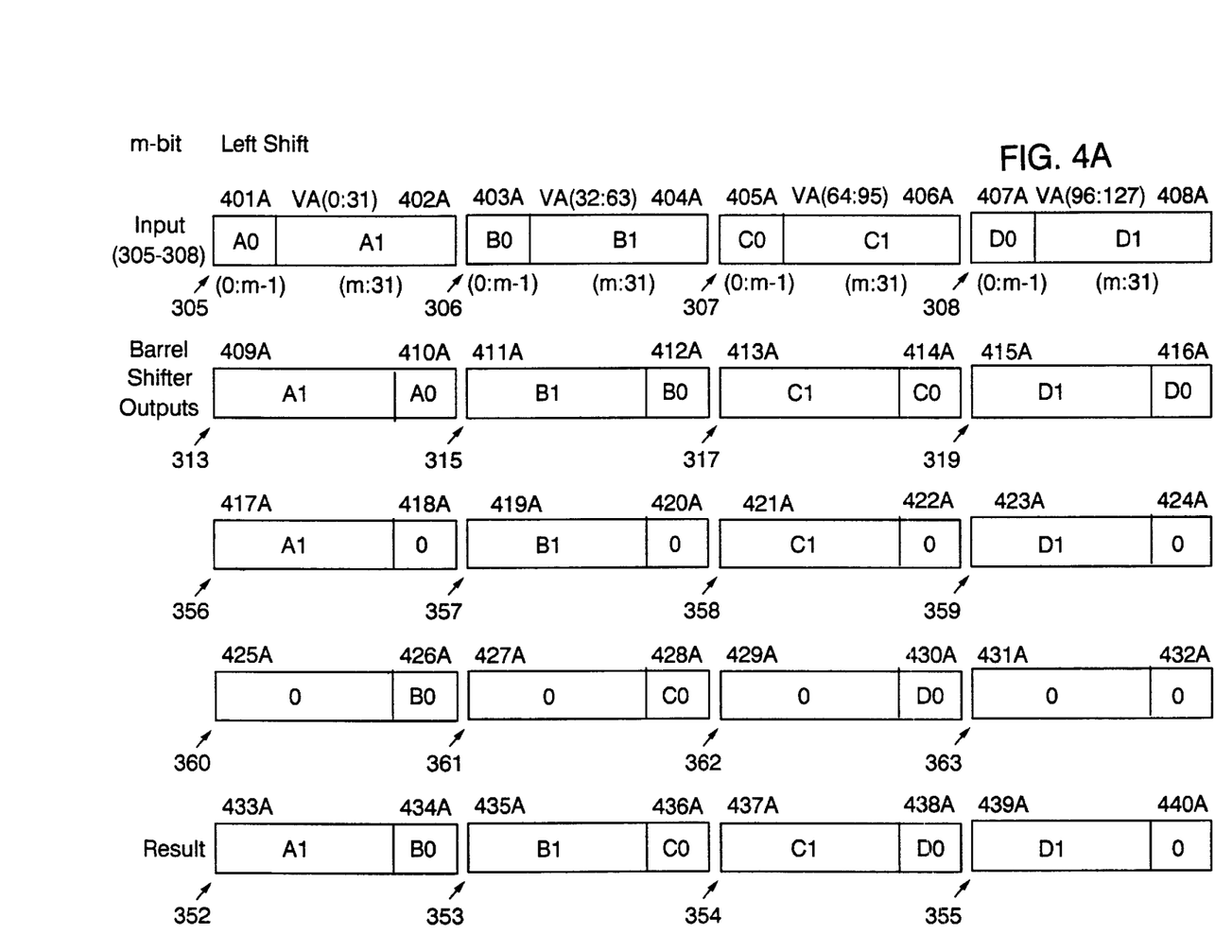
FIG. 4A schematically illustrates data flow for a left shift operation in a vector word shift mechanism in accordance with an embodiment of the present invention.
Figure 4B:
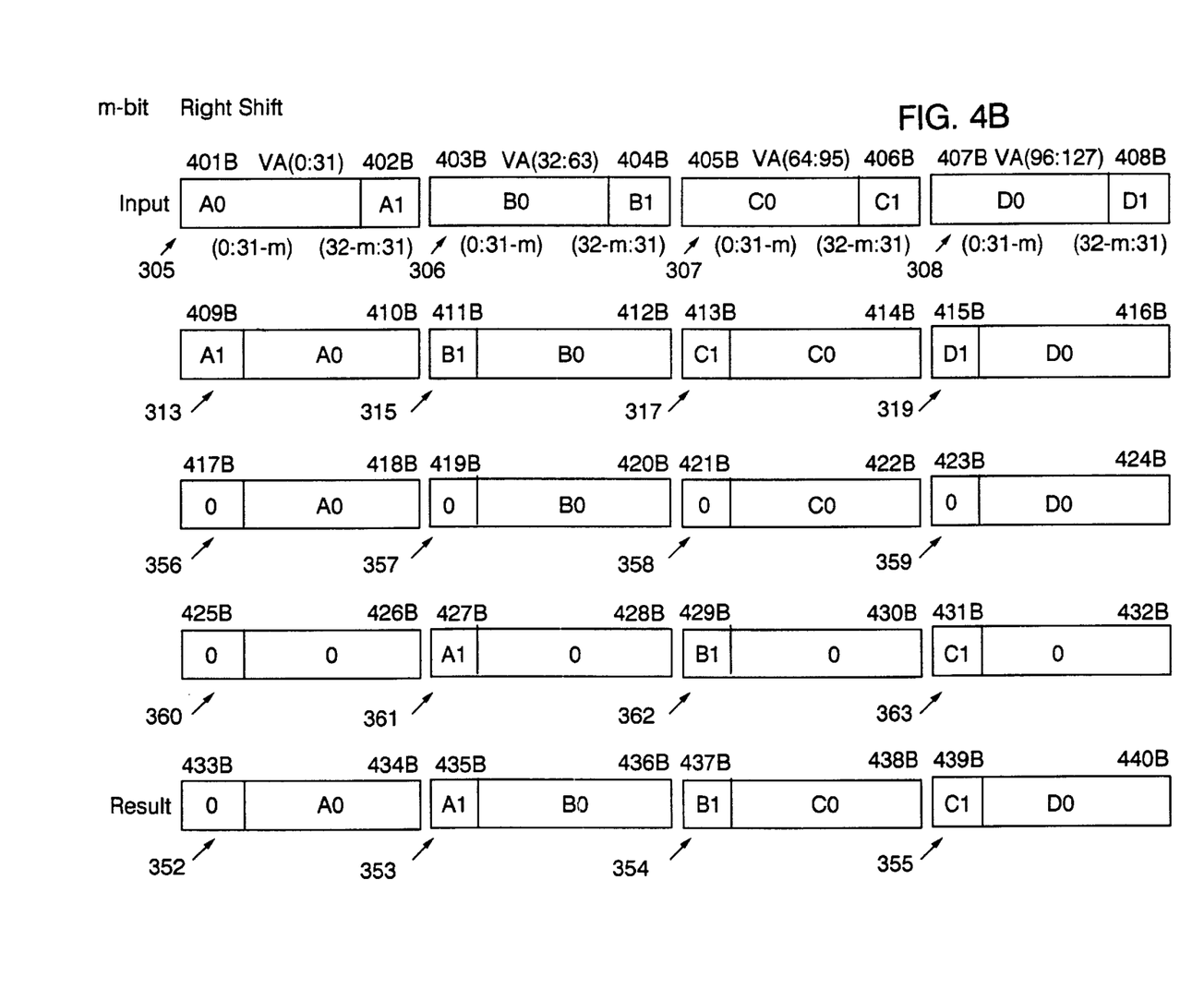
FIG. 4B schematically illustrates data flow for a right shift operation in a vector word shift mechanism in accordance with an embodiment of the present invention.

The portions of operand VA input to vector word shift mechanism 300 are schematically illustrated in FIGS. 4A and 4B. FIG. 4A schematically illustrates bit manipulations of each portions of vector operand VA at various stages between inputs 305–308 and outputs 352–355 of vector word shift mechanism 300. Similarly, FIG. 4B schematically illustrates bit manipulations for m-bit right shift operations for the various stages between the inputs 305–308, and outputs 352–355 of vector word shift mechanism 300.

Each portion of operand VA is illustrated in FIGS. 4A and 4B as having an m-bit portion and a 32-m bit portion. This is to facilitate description of the bit transformations through the stages of vector word shift mechanism 300. Consider first an m-bit left shift operation, FIG. 4A. Input 305 to barrel shifter 301 includes a m-bit portion A0 in field 401A and a 32-m bit portion, A1, in field 402A. Similarly, input 306 has a portion of operand VA having m-bit portion B0, field 403A, and 32-m bit portion B1 in field 404A, input 307 with portions C0 and C1 in fields 405A and 406A, respectively, of length m, and 32-m bits, respectively. Input 308 has a portion of operand, VA, including m-bit portion D0, in field 407A, and 32-m bit portion D1, in field 408A.

Barrel shifters 301–304 effect an m-bit left rotation of their respective input data signals. The data at the output of barrel shifters 301–304 are illustrated in fields 409A and 410A, 411A and 412A, 413A and 414A, and 415A and 416A, respectively. AND gates 314, 316, 318, and 320 receive outputs 313, 315, 317, and 319, respectively on one input to each of the AND gates. At a second input, each of these AND gates receives a clear mask, clear masks 327–330, respectively. For a logical shift instruction with a 128-bit operand, each of clear masks 327–330 are the same, and for a left shift consists of 32-m bits having the value 1, and the m least significant bits having the value 0. The data values at outputs 356–359 from AND gates 314, 316, 318, and 320, respectively, are shown in fields 417A and 418A, 419A and 420A, 421A and 422A, and 423A and 424A, respectively. Thus, output 356 consists of a 32-m portion, A1, in field 417A, and m-zeros in field 418A. Similarly, output 357 has a 32-m bit portion 419A and an m-bit portion having all zero bits, field 420A. Likewise, 32-m bit portions, C1 and D1, appear on outputs 358 and 359 as illustrated in fields 421A and 423A with the m-bit remaining portions of outputs 358 and 359 having 0 bits as shown in fields 422A and 424A, respectively.

The outputs 360–363 from MUXs 337–340 are shown in fields 425A and 426A, 427A and 428A, 429A and 430A, and 431A and 432A, respectively. For a left shift operation, control signals 345–348 select the output from AND gates 322 into MUX 337, the output from AND gate 324 into MUX 338, the output from AND gate 326 into MUX 339, and the output from AND gate 336 into MUX 340. AND gate 322 receives, on one input, the output from barrel shifter 302 illustrated in fields 411A and 412A. AND gate 322 also receives the output of inverter 331 which is the complement of clear mask 327, having all zeros in the 32-m upper bits, and ones in the m lower bits. Thus, the output of AND gate 322 has all zeros in the 32-m upper bits, in field 425A, and the m lower bits have the value B0,being the m lower bits from the output of barrel shifter 302. Similarly, control signal 346 into MUX 338 selects the output of AND gate 324 which appears at output 361. AND gate 324 receives the complement of clear mask 328 which is the same as the complement of clear mask 327 for a m-bit left shift operation. AND gate 324 also receives output 317 from barrel shifter 303. Thus, the output of AND gate 324 consists of 32-m upper bits all having the value zero, from the complement of clear mask 328, and the m lowest bits of output 317, the value C0 in field 428A. Control signal 347 selects the output of AND gate 326 into MUX 339, which is output at output 362. AND gate 326 receives the complement of clear mask 329 from inverter 333. For an m-bit left shift operation, clear mask 329 is the same as clear masks 327 and 328. Thus, output 362 includes 32-m upper bits all having the value zero, field 429A, and the lower m bits having the value D0 from output 319 of barrel shifter 304 that is provided to the second input into AND gate 326. These m lower bits appear in field 430A. Control signal 348 selects the output of AND gate 336 which then appears on output 363 of MUX 340. The input to AND gate 336 having all bits 0 yields an output at output 363 from MUX 340 having all bits 0, as illustrated in fields 431A and 432A in FIG. 4A.

Outputs 352–355 from OR gates 348–351, respectively, each form a portion of output 364 of vector word shift mechanism 300. These are illustrated in fields 433A and 434A, 345A and 436A, 437A and 438A, and 439A and 440A. Output 352 is formed by ORing output 356 and output 360. Thus, the value A1 in field 417A is ORed with the zero bits in field 425A to form field 433A, with the value A1, and the zeros in field 418A are ORed with the value B0 in field 426A to form field 434A. Thus, output 352 consists of 32-m bits having a data value A1 and m-bits having the value B0. Similarly, output 353 is formed by ORing output 357 and 361, to form output 353 having 32-m upper bits with the value B1, in field 435A, and the m-bits with the value C0, in field 436A. Output 354 includes the 32-m upper bits having the value C1, in field 437A, formed by ORing the value C1 in field 421A with the zeros in field 429A. Output 355 include the 32-m upper bits having a value D1 formed by the logical OR of D1 in field 423A and the zeros in field 431A and output 355 has m lowest bits each with the value zero formed by logical OR of the m zero bits in field 424A with the m zero bits in field 432A. Thus, outputs 352–355 form the result of an m-bit left shift of operand VA.

FIG. 4B illustrates the data values at various stages in vector word shift mechanism 300 for an m-bit right shift. Portions of operand, VA, provided on inputs 305–308 are illustrated in fields 401B and 402B, 403B and 404B, 405B and 406B, and 407B and 408B, respectively. Each portion is shown partitioned into a 32-m bit length portion and an m-bit length portion. Input 305 includes 32-m bit portion A0 in field 401B and m-bit portion, A1, in field 402B. Similarly, input 306 has 32-m bit portion B0 in field 403B and m-bit portion B1 in field 404B, input 307 has 32-m bit portion C0 in field 405B and m-bit portion C1 in field 406B, and input 308 has 32-m bit portion D0 in field 407B and m-bit portion D1 in field 408B.

For an m-bit right shift, each of outputs 313, 315, 317, and 319 from barrel shifters 301–304, respectively, are m-bit right rotations of the corresponding portions of operand, VA, input to barrel shifters 301–304. Thus, output 313 has m upper bits having the value A1, in field 409B, and 32-m lower bits having the value A0, in field 410B. Similarly, output 315 has the value B1 in field 411B, and the value B0 in field 412B, output 317 with value C1 in field 413B and C0 in field 414B, and output 319 having value D1 in field 415B and D0, in field 416B.

Clear masks 327–330, for a m-bit right shift, includes m upper bits each having the value 0, and 32-m lower bits all having the value 1. Output 313 is ANDed with clear mask 327 and AND gate 314 to form output 356 shown in fields 417B and 418B. Output 356 has m-upper bits having the value 0, field 417B, and 32-m lower bits having the value A0, field 418B. Similarly, outputs 357–359 have m upper bits having the value 0, fields 419B, 421B, and 423B, and 32-m lower bits having the value B0 in field 420B, C0 in field 422B, and D0 in field 424B, respectively.

Control signals 345–348 provided to MUXs 337–340, respectively, select outputs from AND gates 335, 321, 323, and 325, respectively, for an m-bit right shift. The output of AND gate 335 has a plurality of bits all of which are zero because of one of its inputs having all bits 0, and this appears on output 360 of MUX 337, as shown in fields 425B and 426B. AND gate 321 has one input constituting the complement of clear mask 328 which includes m upper bits having the value 1 and 32-m lower bits having the value 0, for a m-bit right shift. A second input to AND gate 321 is obtained from output 313 of barrel shifter 301. Thus, the output of AND gate 321 and consequently 361 from MUX 338 has m upper bits that are the m upper bits of output 313 and 32-m lower bits, all of which are zero, from the output of inverter 332. Output 361 is illustrated in fields 427B and 428B. Output 362 from MUX 339 is derived from the output of AND gate 323 and, in similar fashion to output 361, includes the m upper bits of output 315 from barrel shifter 302, field 411B, and 32-m lower bits all of which are zero, from the output of inverter 333. This is illustrated in field 429B including the value B1 and field 430B having the value 0. Similarly, output 363 has m upper bits having the value C1 in field 431B obtained from the m upper bits, field 413B of output 317. The lower 32-m bits of output 363 are zero, field 432B.

Each of outputs 352–355 from OR gates 348–351 form a portion of output 364 of vector word shift mechanism 300. Output 352 is formed by logically ORing output 356 and output 360. Consequently, output 352 consists of m upper bits all having the value 0, in field 433B, from fields 417B and 425B, and 32-m lower bits having the value A0 in field 434B arising from the value A0 in field 418B. Output 353 is formed by logically ORing output 357 of AND gate 316 and output 361 from MUX 338. Output 353 has m upper bits having the value A1, in field 435B, from the m upper bits of output 361 in field 427B and 32-m lower bits, in field 436B, from the 32-m lower bits of output 357, in field 420B. Similarly, output 354 and output 355 have m upper bits having the value B1, in field 437B, and the value C1, in field 439B, respectively. These are derived from the m upper bits of output 362, field 429B and the m upper bits of output 363, field 431B, respectively. The 32-m lower bits of output 354 and 355 arise from the 32-m lower bits of output 358, field 422B, and the 32-m lower bits of output 359, field 424B, respectively. Thus, output 364 of vector word shift mechanism 300 has m upper bits having the value 0. The m lower bits of operand, VA, having the value D1, field 408B, are lost.

Referring again to FIG. 3, in a vector logical shift operation in vector word shift mechanism 300, control signals 345–348 select for sign extend masks 341–344, respectively. Each of outputs 352–355 may represent an independent shift of each of the inputs 305–308, and each of clear masks 327–330 may, concomitantly, have a different, preselected value. The value of each clear mask determines the number of bits by which each input 305–308 is shifted, as well as the direction of the shifts. Thus, in an embodiment in which barrel shifters 301–304 are 32-bit shifters, a j-bit shift of input 305 and a k-bit shift of input 306 may be effected by a clear mask 327 having j bits of value one with 32-j bits having the value zero, and clear mask 328 having k bits of value one and 32-k bits of value zero. A left shift of input 305 would have the lower j bits of value one, and conversely for a right shift. Left and right shifts of input 306 are effected similarly with respect to the k bits of value one. Vector logical shifts of inputs 307 and 308 are implemented in the same fashion.

Vector word shift mechanism 300 may also generate vector algebraic shifts. As in vector logical shifts, control signals 345–348 select for sign extend masks 341–344, respectively. However, one or more of sign extended masks 341–344 has a plurality of bits of value one. The number of such bits corresponds to the size of the bit shift, and the location corresponds to the shift direction. Otherwise, the operation of vector word shift mechanism 300 in effecting vector algebraic shifts is as in vector logical shift operation.

Although the present invention and its advantages have been described in detail, it should be understood that various changes, substitutions and alterations can be made herein without departing from the spirit and scope of the invention as defined by the appended claims.

What is claimed is:

1. An apparatus for generating partial logical shifts of a logic signal comprising:
   a plurality of barrel shifters, each barrel shifter having an input adapted for receiving a portion of said logic signal; and
   a plurality of logic circuits, each logic circuit having a first input coupled to an output of a corresponding barrel shifter, wherein a first subset of said plurality of logic circuits have a second input coupled to an output of a succeeding barrel shifter, and a second subset of said plurality of logic circuits has a third input coupled to an output of a preceding barrel shifter, wherein an output of each of logic circuit outputs a portion of a partially shifted logic signal, said output of each logic circuit being a logical combination formed in response to said output of said corresponding barrel shifter and said second and third input signals.

2. The apparatus of claim 1 wherein each said logic circuit includes a third input adapted for receiving a mask signal, said logic circuit logically combining said mask signal with said output of said corresponding barrel shifter to form a first portion of said output of said logic circuit.

3. The apparatus of claim 2 wherein each said logic circuit includes an inverter for receiving said mask signal, said inverter outputting a logical complement of said mask signal, and wherein each logic circuit of said first subset logically combines said complement and said output of said succeeding barrel shifter, and each logic circuit of said second subset logically combines said complement with said output of said preceding barrel shifter.

4. The apparatus of claim 3 wherein each logical combination is operable for selection in response to a control signal, to form a second portion of said output of said logic circuit.

5. The apparatus of claim 4 wherein each said logic circuit includes a multiplexer (MUX) having an input receiving a corresponding one of each said logical combination, each said MUX adapted to receive said control signal.

6. The apparatus of claim 3 wherein each said logic circuit of said first subset ANDs said complement and said output of said succeeding barrel shifter.

7. The apparatus of claim 3 wherein each said logic circuit of said second subset ANDs said complement and said output of said preceding barrel shifter.

8. The apparatus of claim 2 wherein each said logic circuit ANDs said mask signal and said output of said corresponding barrel shifter.

9. The apparatus of claim 1 wherein each said logic circuit includes a first AND gate having a first input coupled to said output of said corresponding barrel shifter, and a second input adapted for receiving a mask signal.

10. The apparatus of claim 9 wherein each said logic circuit includes an inverter having an input adapted for receiving said mask signal, each said logic circuit of said first subset including a second AND gate having a first input coupled to an output of said inverter and a second input coupled to said output of said succeeding barrel shifter, and wherein each said logic circuit of said second subset includes a third AND gate having a first input coupled to said output of said inverter and a second input coupled to said output of said preceding barrel shifter.

11. The apparatus of claim 10 wherein each said logic circuit includes a multiplexer (MUX), said MUX having a first input coupled to an output of said second AND gate and a second input coupled to an output of said third AND gate, said MUX outputting said second portion of said logic circuit output.

12. The apparatus of claim 9 wherein each said logic circuit includes an OR gate having a first input coupled to an output of said first AND gate, and a second input adapted for receiving a logical signal generated in response to said second and third input signals.

13. A method of generating m-bit partial logical shifts of a logical signal comprising the steps of:
   rotating each portion of a plurality of portions of said logical signal by m-bits, thereby forming a plurality of corresponding rotated portions;
   masking each said rotated portion with a preselected mask signal;
   masking each said rotated portion with a complementary mask formed by complementing said preselected mask signal; and
   logically combining each logical output from said step of masking with a preselected mask with a preselected one of each logical output from said step of masking with said complementary mask.

14. The method of claim 13 wherein, for a right shift, said preselected one of each logical output from said step of masking with said complementary mask is a logical output generated in response to a preceding rotated portion, and for a left shift, said preselected one of each logical output from said step of masking with said complementary mask is a logical output generated in response to a succeeding rotated portion.

15. The method of claim 14 wherein said step of masking each said rotated portion with a preselected mask signal comprises the step of ANDing each said rotated portion with said preselected mask.

16. The method of claim 13 wherein said step of logically combining each logical output comprises the step logically ORing each logical output from said step of masking with a preselected mask with a preselected one of each logical output from said step of masking with said complementary mask.

17. The method of claim 13 wherein said preselected mask comprises:

for a right shift, a logical signal including m upper bits having a value of zero; and for a left shift, a logical signal including m lower bits having a value of zero.

18. The method of claim 13 wherein said step of masking each said rotated portion with a complementary mask formed by complementing said preselected mask signal comprises the step of ANDing each said rotated portion with said complementary mask.

19. A data processing system for generating partial logical shifts of a logical comprising:

an instruction dispatch device adapted for retrieving instructions from an instruction storage device;

a partial logical shift device coupled to said instruction dispatch device, and generating a partially shifted output signal from the logical signal received from said dispatch device in response to instructions therefrom, said shift device comprising:

a plurality of barrel shifters, each barrel shifter having an input adapted for receiving a portion of said logic signal; and a plurality of logic circuits, each logic circuit having a first input couple to an output of a first predetermined barrel shifter, and a second input coupled to an output of a second predetermined barrel shifter, wherein each said logic circuit outputs a portion of said partially shifted output signal, said output of each logic circuit being a logical combination formed in response to said first and second inputs, wherein said plurality of said logics includes a first subset of logic circuits having a third input coupled to an output of a third predetermined barrel shifter.

20. A data processing system for generating partial logical shifts of a logical comprising:

an instruction dispatch device adapted for retrieving instructions from an instruction storage device;

a partial logical shift device coupled to said instruction dispatch device, and generating a partially shifted output signal from the logical signal received from said dispatch device in response to instructions therefrom, said shift device comprising:

a plurality of barrel shifters, each barrel shifter having an input adapted for receiving a portion of said logic signal; and a plurality of logic circuits, each logic circuit having a first input couple to an output of a first predetermined barrel shifter, and a second input coupled to an output of a second predetermined barrel shifter, wherein each said logic circuit outputs a portion of said partially shifted output signal, said output of each logic circuit being a logical combination formed in response to said first and second inputs, wherein each logic circuit of said plurality of logic circuits includes a third input adapted for receiving a mass signal, and wherein each logic circuit includes an inverter having an input comprising said third input, said inverter outputting a complimentary mask signal, said output of said logic circuit including a portion formed in response to said complementary mask signal.

21. A data processing system for generating partial logical shifts of a logical comprising:

an instruction dispatch device adapted for retrieving instructions from an instruction storage device;

a partial logical shift device coupled to said instruction dispatch device, and generating a partially shifted output signal from the logical signal received from said dispatch device in response to instructions therefrom, said shift device comprising:

a plurality of barrel shifters, each barrel shifter having an input adapted for receiving a portion of said logic signal; and a plurality of logic circuits, each logic circuit having a first input couple to an output of a first predetermined barrel shifter, and a second input coupled to an output of a second predetermined barrel shifter, wherein each said logic circuit outputs a portion of said partially shifted output signal, said output of each logic circuit being a logical combination formed in response to said first and second inputs, wherein each logic circuit of said plurality of logic circuits includes a third input adapted for receiving a mass signal, and wherein each logic includes an AND gate, said AND gate having a first input comprising said logic circuit first input, and the second input comprising said logic circuit third input, said AND gate outputting a portion of said output of each logic circuit.

22. A data processing system for generating partial logical shifts of a logical comprising:

an instruction dispatch device adapted for retrieving instructions from an instruction storage device;

a partial logical shift device coupled to said instruction dispatch device, and generating a partially shifted output signal from the logical signal received from said dispatch device in response to instructions therefrom, said shift device comprising:

a plurality of barrel shifters, each barrel shifter having an input adapted for receiving a portion of said logic signal; and a plurality of logic circuits, each logic circuit having a first input couple to an output of a first predetermined barrel shifter, and a second input coupled to an output of a second predetermined barrel shifter, wherein each said logic circuit outputs a portion of said partially shifted output signal, said output of each logic circuit being a logical combination formed in response to said first and second inputs, wherein said plurality of said logic circuits includes a first subset of logic circuits, said first subset including logic circuits wherein said second predetermined barrel shifter is a barrel shifter succeeding said first predetermined barrel shifter, and wherein said partial logical shift device is adapted for receiving a mass signal, and wherein each logic circuit of said first subset comprises an AND gate, said AND gate having a first input coupled to said barrel shifter preceding said first predetermined barrel shifter and a second input adapted for receiving a complimentary mask signal generated in response to said mask signal, an output of said AND gate forming a portion of said output of each logic circuit.

23. The data processing system of claim 22 wherein each logic circuit includes a multiplexer (MUX), each said MUX having an input coupled to said output of said AND gate, each said MUX adapted for receiving a control signal and outputting a portion of said output of each logic circuit in response thereto.

24. A data processing system for generating partial logical shifts of a logical comprising:
an instruction dispatch device adapted for retrieving instructions from an instruction storage device;
a partial logical shift device coupled to said instruction dispatch device, and generating a partially shifted output signal from the logical signal received from said dispatch device in response to instructions therefrom, said shift device comprising:
a plurality of barrel shifters, each barrel shifter having an input adapted for receiving a portion of said logic signal; and
a plurality of logic circuits, each logic circuit having a first input couple to an output of a first predetermined barrel shifter, and a second input coupled to an output of a second predetermined barrel shifter, wherein each said logic circuit outputs a portion of said partially shifted output signal, said output of each logic circuit being a logical combination formed in response to said first and second inputs, wherein said plurality of said logic circuits includes a first subset of logic circuits, said first subset including logic circuits wherein said second predetermined barrel shifter is a barrel shifter preceding said first predetermined barrel shifter, and wherein said partial logical shift device is adapted for receiving a mask signal, and wherein each logic circuit of said first subset comprises an AND gate, said AND gate having a first input coupled to said barrel shifter succeeding said first predetermined barrel shifter and a second input adapted for receiving a complimentary mask signal generated in response to said mask signal, an output of said AND gate forming a portion of said output of each logic circuit.

25. The data processing system of claim 24 wherein each logic circuit includes a multiplexer (MUX), each said MUX having an input coupled to said output of said AND gate, each said MUX adapted for receiving a control signal and outputting a portion of said output of each logic circuit in response thereto.

26. An apparatus for generating partial logical shifts of a logical signal comprising:
a first barrel shifter having an input adapted for receiving a first portion of said logical signal;
a second barrel shifter having an input adapted for receiving a second portion of said logical signal;
a third barrel shifter having an input adapted for receiving a third portion of said logical signal;
a fourth barrel shifter having an input adapted for receiving a fourth portion of said logical signal;
a first logic circuit coupled to an output of said first barrel shifter, said first logic circuit comprising:
a first AND gate having a first input coupled to said first barrel shifter, and a second input adapted for receiving a mask signal;
a first inverter having an input adapted for receiving said mask signal, said inverter outputting a complementary mask signal;
a second AND gate having first input coupled to an output of said first inverter, and a second input coupled to an output of said second barrel shifter;
a first multiplexer (MUX) having a first input coupled to an output of said second AND gate, a second input receiving a plurality of bits all of which have the value zero, and a third input adapted for receiving a control signal, said first MUX selecting a signal for outputting in response thereto; and
a first OR gate having a first input coupled to an output of said first AND gate, and a second input coupled to an output of said first MUX, said OR gate outputting a first portion of an output signal;
a second logic circuit coupled to said output of said second barrel shifter, said second logic circuit comprising:
a third AND gate having a first input coupled to said second barrel shifter, and a second input adapted for receiving said mask signal;
a second inverter having an input adapted for receiving said mask signal, said inverter outputting a complementary mask signal;
a fourth AND gate having first input coupled to an output of said second inverter, and a second input coupled to an output of said third barrel shifter;
a fifth AND gate having a first input coupled to said output of said second inverter, and a second input coupled to said output of said first barrel shifter;
a second multiplexer (MUX) having a first input coupled to an output of said fourth AND gate, a second input coupled to an output of said fifth AND gate, and a third input adapted for receiving said control signal, said second MUX selecting a signal for outputting in response thereto; and
a second OR gate having a first input coupled to an output of said third AND gate, and a second input coupled to an output of said second MUX, said OR gate outputting a second portion of said output signal;
a third logic circuit coupled to said output of said third barrel shifter, said second logic circuit comprising:
a sixth AND gate having a first input coupled to said third barrel shifter, and a second input adapted for receiving said mask signal;
a third inverter having an input adapted for receiving said mask signal, said inverter outputting a complementary mask signal;
a seventh AND gate having first input coupled to an output of said third inverter, and a second input coupled to an output of said second barrel shifter;
a eighth AND gate having a first input coupled to said output of said third inverter, and a second input coupled to said output of said fourth barrel shifter;
a third multiplexer (MUX) having a first input coupled to an output of said seventh AND gate, a second input coupled to an output of said eighth AND gate, and a third input adapted for receiving said control signal, said third MUX selecting a signal for outputting in response thereto; and
a third OR gate having a first input coupled to an output of said sixth AND gate, and a second input coupled to an output of said third MUX, said OR gate outputting a third portion of said output signal; and
a fourth logic circuit coupled to an output of said fourth barrel shifter, said fourth logic circuit comprising:

a ninth AND gate having a first input coupled to said fourth barrel shifter, and a second input adapted for receiving said mask signal;

a fourth inverter having an input adapted for receiving said mask signal, said inverter outputting a complementary mask signal;

a tenth AND gate having first input coupled to an output of said fourth inverter, and a second input coupled to an output of said third barrel shifter;

a fourth multiplexer (MUX) having a first input coupled to an output of said tenth AND gate, a second input receiving a plurality of bits all of which have the value zero, and a third input adapted for receiving said control signal, said fourth MUX selecting a signal for outputting in response thereto; and a fourth OR gate having a first input coupled to an output of said ninth AND gate, and a second input coupled to an output of said fourth MUX, said OR gate outputting a fourth portion of said output signal.

* * * * *